United States Patent
Günther et al.

(10) Patent No.: US 11,538,144 B2
(45) Date of Patent: Dec. 27, 2022

(54) METHOD FOR DETERMINING ERRORS IN PARAMETERS DERIVED FROM DIGITAL OBJECT REPRESENTATIONS

(71) Applicant: Volume Graphics GmbH, Heidelberg (DE)

(72) Inventors: Thomas Günther, Heidelberg (DE); Christof Reinhart, Heidelberg (DE); Christoph Poliwoda, Heidelberg (DE)

(73) Assignee: Volume Graphics GmbH, Heidelberg (DE)

( * ) Notice: Subject to any disclaimer, the term of this patent is extended or adjusted under 35 U.S.C. 154(b) by 92 days.

(21) Appl. No.: 16/971,474

(22) PCT Filed: Feb. 14, 2019

(86) PCT No.: PCT/EP2019/053665
§ 371 (c)(1),
(2) Date: Aug. 20, 2020

(87) PCT Pub. No.: WO2019/162182
PCT Pub. Date: Aug. 29, 2019

(65) Prior Publication Data
US 2020/0380666 A1  Dec. 3, 2020

(30) Foreign Application Priority Data
Feb. 20, 2018  (DE) .................... 10 2018 103 714.7

(51) Int. Cl.
*G06T 7/00*  (2017.01)
*G06T 7/11*  (2017.01)

(52) U.S. Cl.
CPC .............. *G06T 7/0004* (2013.01); *G06T 7/11* (2017.01); *G06T 2207/10081* (2013.01); *G06T 2207/20021* (2013.01); *G06T 2207/30164* (2013.01)

(58) Field of Classification Search
CPC ..................... G06T 7/0004; G06T 7/11; G06T 2207/10081; G06T 2207/20021; G06T 2207/30164
See application file for complete search history.

(56) References Cited

U.S. PATENT DOCUMENTS

| 7,215,732 | B2 * | 5/2007 | Yin ........................... G06T 5/10 378/98 |
| 2002/0075383 | A1 * | 6/2002 | Trobaugh .................. G06T 7/00 348/42 |

(Continued)

FOREIGN PATENT DOCUMENTS

| DE | 102014115851 A1 | 5/2016 |
| WO | 2019/162182 A1 | 8/2019 |

OTHER PUBLICATIONS

European Patent Office/ISA, International Search Report for PCT Application No. PCT/EP2019/053665, dated Apr. 8, 2019.

(Continued)

*Primary Examiner* — Kenny A Cese
(74) *Attorney, Agent, or Firm* — Socal IP Law Group LLP; Angelo Gaz (57) ABSTRACT

The invention relates to a method for determining errors in at least one parameter of the object derived from a digital representation of an object, wherein the digital representation comprises a large number of pixels arranged on a grid. At least one item of image information that quantifies a material-specific value of the object at the position of the pixel is assigned to a pixel. The image information results from a metrological mapping of the object, and is overlaid with statistical noise. As a result of the metrological mapping of the object, the image information of a first pixel is correlated to the image information of pixels within a surroundings of the first pixel defined by a correlation length of the image.

12 Claims, 4 Drawing Sheets

(56) References Cited

U.S. PATENT DOCUMENTS

| | | | |
|---|---|---|---|
| 2005/0111760 A1 | 5/2005 | Lal et al. | |
| 2005/0286388 A1* | 12/2005 | Ayres | G11B 7/083 369/103 |
| 2011/0075935 A1* | 3/2011 | Baqai | G06T 7/0002 382/195 |
| 2013/0294645 A1* | 11/2013 | Sibarita | G06T 7/11 382/103 |
| 2013/0308866 A1* | 11/2013 | Lin | G06K 9/46 382/195 |
| 2014/0205166 A1* | 7/2014 | Benameur | G06T 5/003 382/131 |
| 2018/0232596 A1* | 8/2018 | Gal-Yam | G06V 10/30 |
| 2018/0309995 A1* | 10/2018 | He | H04N 19/98 |
| 2019/0271650 A1* | 9/2019 | Ma | G02B 21/008 |

OTHER PUBLICATIONS

European Patent Office/ISA, Written Opinion PCT Application No. PCT/EP2019/053665, dated Apr. 8, 2019.

German Patent Office, Office Action for German Patent Application No. 10 2018 103 714.7, dated Oct. 23, 2019.

Dewulf, Wim et al. "Uncertainty determination and quantification for dimensional measurements with industrial computed tomography" CIRP Annals, Elsevier BV, NE, CH, ER, vol. 62, No. 1, Apr. 15, 2013 (Apr. 15, 2013), pp. 535-538.

Robert Schmitt et al. Uncertainty in measurement for x-ray-computed tomography using calibrated work pieces' Measurement Science and Technology, IOP, Bristol, GB, vol. 21, No. 5, May 1, 2010 (May 1, 2010), p. 54008.

Ikram E Abdou et al. "Survey of image quality measurements" Nov. 2, 1986, Nov. 2, 1986 (Nov. 2, 1986), pp. 71-78.

Jochen Hiller et al. "Physical characterization and performance evaluation of an x-ray micro-computed tomography system for dimensional metrology applications" Measurement Science and Technology, 10P, Bristol, GB, vol. 23, No. 8, Jun. 14, 2012 (Jun. 14, 2012), p. 85404.

Ketcham Richard A et al. "Characterizing, measuring, and utilizing the resolution of CT imagery for improved quantification of fine-scale features" Nuclear Instruments & Methods in Physics Research Section B: Beam Interactions With Materials and Atoms, vol. 324, Apr. 1, 2014 (Apr. 1, 2014), pp. 80-87.

* cited by examiner

METHOD FOR DETERMINING ERRORS IN PARAMETERS DERIVED FROM DIGITAL OBJECT REPRESENTATIONS

RELATED APPLICATION INFORMATION

This patent claims priority from International PCT Patent Application No. PCT/EP2019/053665, filed Feb. 14, 2019 entitled, "METHOD FOR DETERMINING ERRORS IN PARAMETERS DERIVED FROM DIGITAL OBJECT REPRESENTATIONS", which claims priority to German Patent Application No. 0 2018 103 714.7, filed Feb. 20, 2018 all of which are incorporated herein by reference in their entirety.

The invention relates to a computer-implemented method for determining errors in at least one parameter of the object derived from a digital representation of an object in accordance with the descriptions herein.

A large number of image-generating methods that permit an examination both of a surface of a workpiece as well as of an inner structure of the workpiece have become established over past years in the field of workpiece inspection. Computer tomography, magnetic resonance tomography and sonography are in particular to be mentioned here in relation to an examination of the interior structure of a workpiece. In the context of a workpiece inspection carried out by means of one of the above-mentioned methods, the dimensions of a workpiece or of a part geometry of the workpiece must often be examined from the point of view of correspondence with predefined set values. For this purpose, a geometry of the represented workpiece must first be ascertained from the image information ascertained in the course of a measurement on the basis of the positions of the respective material boundary surfaces, wherein said information is frequently present as grey levels.

In order to obtain a comparability of dimensions ascertained in this way with predefined guide values from, for example, a technical drawing or construction drawing, it is in general necessary to state an uncertainty of a dimension obtained from the analysis of the grey levels. Similar considerations also apply to any other parameter of a workpiece that can be ascertained from the analysis of grey levels, such as for example the positions of features, layer thicknesses, porosity or the like. The ascertainment of such uncertainties here is, however, usually associated with considerable computing effort, which means that efficient use of the non-destructive workpiece inspection in the field, for example, of in-line workpiece inspection, appears to be impractical.

The present invention is therefore based on the object of providing a computer-implemented method that permits a more efficient determination of uncertainties or of errors in a parameter derived from a digital representation of the object.

The primary features of the invention are given herein. Embodiments are the object of descriptions herein.

In a first aspect, the invention relates to a computer-implemented method for determining errors in at least one parameter of the object derived from a digital representation of an object, wherein the digital representation comprises a large number of pixels arranged on a grid. At least one item of image information that quantifies a material-specific value of the object at the position of the pixel is assigned here to a pixel. The image information in turn results from a metrological mapping of the object, and is overlaid with statistical noise. As a result of the metrological mapping of the object, the image information of a first pixel is correlated to the image information of pixels within a surroundings of the first pixel defined by a correlation length of the image information. The method here initially comprises the ascertainment of the object representation and the subsequent ascertainment of the correlation length of the object representation. A first subset of pixels from the large number of pixels is then ascertained, wherein the pixels of the first subset of pixels are spaced apart from one another in the object representation by at least the correlation length. The at least one parameter is then ascertained from the image information of the first subset of pixels, and an error for the at least one parameter ascertained from the image information of the first subset of pixels is ascertained.

The present invention is based on the recognition that the determination of an error from a set of measured values that are subject to error can be simplified if the measured values that serve for the determination of a parameter as well as their errors are not statistically correlated to one another. In this case, the determination of an error of a parameter from the errors of the measured values on which the determination of the parameter is based can in general be performed by means of simpler mathematics than in the case of correlated measured values. The invention is furthermore based on the recognition that the omission of measured values that in any case are correlated with further measured values taken into consideration in the calculation does not signify any loss of information, since, due to the correlation of the measured values, the information of the omitted measured values is also contained in the pixels respectively correlated with an omitted pixel. It follows that through the method according to the invention, the computing effort for the determination of an error for a parameter of a workpiece derived from a digital representation can be reduced without impairing the accuracy of the result.

In the context of the present application, an "error" always refers to an uncertainty in the sense of a statistical error, i.e. an error that obeys a statistical distribution. An example for the source of such a statistical error is the above-mentioned noise in image information which usually—at each individual pixel—follows a Gaussian distribution. Depending on the metrological arrangement, the statistical noise at a pixel can be correlated to the noise at other pixels, i.e. the statistical values are not independent of one another.

The image information of a pixel is here essentially composed of two components. The first component of an item of image information is the signal itself that would result from the metrological mapping of the object if the ascertainment of the image information were not subject to any noise. Even without the influence of a statistical noise, the signal would already be subject to a range of systematic fuzziness caused inter alia by the image-generating system. Such an image fuzziness also induces a relationship between pixels, for example through the "smearing" of a measured value over a plurality of pixels. This relationship between pixels resulting from systematic fuzziness is also referred to below as "correlation". The second component of the image information is the statistical noise that overlays each signal and yields an additive contribution to the information. The noise of a pixel is also caused by the image-generating system, and is subject to a statistical distribution. Noise can, for example, be generated by the evaluation electronics of an image-generating system (thermal noise). As a result of the above-described fuzziness of an image-generating system, the statistical noise that overlays the signal at individual pixels is smeared over a plurality of pixels, whereby a correlation of the noise, and consequently of the image information, is induced at a plurality of points.

The correlation of the image information here extends over a correlation length over which the image information of a first pixel is seen to be "correlated" with image information from pixels that are spaced by less than the correlation length from the first pixel. The image information from pixels whose spacing from one another is greater than the correlation length is seen to be "uncorrelated". In this context, referring to image information as "uncorrelated" does not mean that the image information items have no correlation to one another. Rather is the image information of pixels seen as uncorrelated when the degree of correlation of the image information falls below a defined threshold value.

A "digital representation" of an object here is a two-dimensional or three-dimensional representation of the object in which image information is assigned to each of the spatially determined pixels that enable an image of the object. The pixels here can be arranged either regularly or irregularly. The "material-specific values" of the represented object that are encoded in the image information for the position of a pixel can for example represent the nature of the material at the position of the pixel, i.e. for example what kind of material is present at a pixel. The image information can also, furthermore, represent a physical property of the material, for example its density.

A "material-specific" value can here be a value that is characteristic for the image-generating method in use. Taking magnetic resonance tomography as an example, the material-specific value can, for example, be a nuclear spin relaxation time. By reproducing such values, the structure of an illustrated object, and in particular its precise geometry, can be represented. To ascertain such an object representation, a measurement can, for example, be taken with a suitable measuring device, or corresponding measured values can be called up from a storage medium.

A represented object can, for example, be overlaid by a grid, wherein a respective local, material-specific value of the object is reproduced at defined grid points. The reproduction of such a material-specific value can, for example, be done by means of a grey level that can adopt values between, for example, 0 and 65,535, which corresponds to a representation with a depth of 16 bits.

A material-specific value can, furthermore, also encode the presence of a material boundary surface and, in particular, of a surface of the represented object. "Material boundary surface" here refers to a surface of the object in which different materials of the object lie adjacent to one another, or along which the object is delimited from its surroundings. It can, for example, be provided here that the pixels of the object representation are arranged in such a way that all the pixels lie on the surface of the object and that they consequently exclusively map the geometric form of the object. In this case the "ascertainment of the object representation" can, for example, signify the derivation of a surface model from the previously described grey levels. The noise in the grey levels here also directly impacts the accuracy of the discovery of material boundary surfaces, from which it follows that the image information relating to a position of a material boundary surface is subject to an uncertainty in the form of noise.

In addition to carrying out a measurement, the "ascertainment of an object representation" can also refer to reading from a data store in which a corresponding object representation is contained.

In the context of a data evaluation, specific parameters of the represented object can in turn be derived from the structure and the geometry of an object. A parameter can, for example, refer to the orientation of the material boundary surfaces that delimit the represented object. These can be derived with methods known to the prior art from the grey levels obtained through application of the image-generating method. A parameter can also, furthermore, as explained at the beginning, reproduce a dimension of a partial geometry of the object or a local property of a material such as, for example, it's porosity. A dimension of the partial geometry of the object can, for example, be derived from the knowledge of the position of surfaces through the application of a geometric fit.

As already explained above, the image information, ascertained with the aid of an image-generating method, of the digital representation of an object is overlaid with statistical noise. Such a statistical noise can, for example, be caused by the measuring arrangement itself, or can arise in the course of the processing of the electronic signals generated in a measurement. According to one form of embodiment of the method, the ascertainment of the error therefore contains the ascertainment of the magnitude of the statistical noise of image information of the pixels, wherein the error in the image information is derived from the magnitude of the statistical noise. The use of the statistical noise as the starting point for a consideration of errors is in particular advantageous when the uncertainty of image information is largely caused by the magnitude of the statistical noise of the digital image. This statistical noise can here, for example, be estimated as a global value of the measuring apparatus, or can be ascertained from appropriate data sources that contain information relating to the noise behavior of a measuring apparatus.

According to one preferred form of embodiment, the magnitude of the statistical noise is, however, ascertained directly from the image information of the pixels. This has the advantage that any possible deviation of the noise behavior from a global value can be reliably captured, so that a robust estimation of an error is possible.

According to a further form of embodiment the magnitude of the statistical noise refers here to the standard deviation of the amplitude of the statistical noise. The use of the standard deviation here has the advantage that local extrema in the excursions of image information caused by noise can be compensated for, and a representative value obtained for the actual noise behavior of the digital representation. The "standard deviation of the amplitude" here refers to the standard deviation of a distribution function that plots the frequency of an amplitude of the noise in the image information of a pixel against the amplitude of the noise. The "amplitude of the noise" in turn describes the deviation, caused by noise, of an item of image information from a value that is truly to be expected. For the determination of such an amplitude it is possible, for example, for the mean value of the image information to be ascertained for a region of the digital representation that contains a relatively homogeneous distribution of the value of the image information, and then, depending on this mean value, for the local deviations to be ascertained for each pixel. The local deviations from the mean value can then be taken as the amplitude of the noise.

It is provided here according to one preferred form of embodiment, that the standard deviation of the amplitude of the noise for a pixel of the object representation is determined from the image information of pixels within a defined surroundings around the pixel. It can, for example, be provided for this purpose that in the determination of the amplitude of the noise for one pixel, a local surroundings around the pixel is first ascertained, within which the image information of the other pixels contained therein are approximately equal. The amplitude of the statistical noise for the pixel can then be ascertained from the image information of these pixels. The use of image information of pixels within a defined surroundings around a pixel for the determination of the magnitude of the statistical noise has the advantage here that a locally varying magnitude of the statistical noise can be taken into consideration. It is, namely, entirely possible that the magnitude of the statistical noise depends on the one hand on the position of a pixel within a digital representation or, on the other hand, on the image information of the pixel. This circumstance is taken into account through the use of pixels from a defined surroundings of a pixel for the determination of a noise amplitude.

The previously described idea, according to which the amplitude of the statistical noise can vary in strength for different regions of a digital representation can also be transferred to the ascertainment of the correlation length. It is thus also entirely possible that the correlation length over which the image information of pixels is still mutually correlated has a different size for different regions of a digital representation. It is therefore provided according to a further form of embodiment, that the method further comprises the division of the object representation into at least two subregions, wherein the correlation length for the pixels of a partial region is ascertained separately for each of the partial regions. The selection of the partial regions can here be made through the position of the pixels within the digital representation, or through the image information contained in the corresponding pixels. If a different correlation length is ascertained here for different subregions, the corresponding correlation length of the subset of pixels that belong to the pixels used in the error determination is accordingly used in the determination of the subsets for the determination of an error of a parameter.

There can be many reasons for the correlation of the image information of different pixels. A correlation of the image information of pixels can, for example, be caused by an incorrect geometrical calibration of the measuring apparatus. Effects that lead to a correlation of the image information can at the same time also be in part responsible for the statistical noise of the image information. Thus for example, when a computer tomograph is used for the ascertainment of the object representation, both a photon noise and detector fuzziness can be possible grounds for a correlation of image information items. In the event that a statistical noise is the trigger for the correlation of image information items, information about the correlation length of the image information can be obtained from the statistical noise itself. In response to this consideration, it is provided according to one form of embodiment of the method that the correlation length is the correlation length of the noise of the image information of the pixels. This is in particular advantageous if the correlation caused by the statistical noise is the predominant factor in the correlation of the image information.

As was already explained previously, it can happen in the digital representation of the object that the statistical noise of the image information has a different magnitude in different regions of the digital object representation. This circumstance is taken into consideration according to a further form of embodiment in that the correlation length of the noise that overlays the image information is ascertained from the image information of pixels of a subregion of the object representation, wherein the image information within the subregion represents a homogeneous region of the represented object. A "homogeneous region" refers here to a subregion of the digital representation within which the image information of the pixels contained is approximately constant or equal, or within which it can be assumed that, apart from the noise of the image information, the image information of the pixels contained therein is approximately constant.

If the statistical noise that overlays the image information is seen as the predominant factor for the correlation of the image information, it is provided according to a further form of embodiment that the ascertainment of the correlation length contains the ascertainment of the autocorrelation of the statistical noise that overlays the image information. To ascertain the autocorrelation of the statistical noise it is possible for the respective amplitude of the statistical noise to be plotted against the position of the pixel along, for example, a profile of pixels. By ascertaining the autocorrelation of this distribution with itself, the correlation length of the statistical noise can then be ascertained. This approach can here, in principle, be carried out in any desired number of dimensions.

According to a further form of embodiment, furthermore, the ascertainment of the autocorrelation can comprise the ascertainment of the spectral power density of the image information and the performance of a Fourier analysis of the spectral power density, from which in turn the correlation length of the noise can be ascertained. A bell-shaped curve is usually obtained here as the autocorrelation function, and this can be approximated to a Gaussian curve through an appropriate fitting process. From the Gaussian curve obtained in this way it is then for example possible for the correlation length to be determined as a multiple of the standard deviation of the Gaussian curve. Through the selection of an appropriate factor, a user can here specify the distance between pixels from which the degree of correlation of corresponding image information of the pixels can be deemed to be "no longer correlated" or "sufficiently uncorrelated". The determination of the correlation length in this way is possible since a statistical noise such as generally occurs in the context of data acquisition by means of an image-generating method is a stationary statistical process. In this case, the spectral power density and the autocorrelation function of the statistical noise can be linked by way of the Fourier transform in accordance with the Wiener-Chintschin theory.

Some of the forms of embodiment described above are aimed at the evaluation of the statistical noise for ascertaining the correlation length of the image information. In certain cases, however, it can happen that a sufficiently accurate evaluation of the information that is present regarding the behavior of the statistical noise is not possible for determination of the correlation length. It is, however, also possible according to a further form of embodiment that the correlation length is the width of a point spread function of the digital representation. The point spread function of a representation generally here provides information regarding how a source which is itself point-like is "smeared" as a result of being represented by the image-generating system, i.e. deviates from the ideal, point-like image. The point spread function here usually follows a bell-shaped curve which, similarly to the approach for ascertaining a correlation length from an autocorrelation described previously, can be approximated by a Gaussian curve. The "width" of the point spread function obtained in this way can then be taken as a multiple of the standard deviation of the Gaussian curve, wherein the maximum degree of correlation between image information items can be chosen through the choice of the corresponding coefficient. The analysis of the point spread function here permits an estimation of an upper limit for the correlation length.

The use of the point spread function to ascertain the correlation length is preferably here only provided when a sufficiently accurate analysis of the statistical noise is either not possible or is very laborious. This can, for example, be the case in object representations in which only very few regions with homogeneously distributed image information are present, so that an estimation of the amplitude of the statistical noise, as was described above by way of example, is not possible or only possible with great difficulty. In this case, the correlation of the statistical noise can then be estimated through consideration of the point spread function which, as was already explained above, causes inter alia a correlation of the statistical noise of multiple pixels. The point spread function of an image-generating system can here be present as global information relating to the image-generating system, and can be read when carrying out the method, for example from a corresponding storage medium.

According to a further form of embodiment it is, however, also possible to ascertain the point spread function from the image information of the object representation. According to this form of embodiment it is provided for this purpose that the ascertainment of the correlation length first the ascertainment of a second subset of pixels, wherein the image information of the second subset of pixels represents at least one material boundary surface of the object. A curve of the image information of the second subset of pixels along a normal to the material boundary surface is subsequently ascertained. The point spread function is then ascertained from the curve of the image information that has been ascertained, whereupon the width of the point spread function is subsequently ascertained. The width of the point spread function ascertained in this way is then used as the correlation length of the object representation. The gradient of the image information along the curve can, for example, be ascertained here in order to ascertain the point spread function from the curve of the image information. The gradient ascertained in this way then immediately provides information about the point spread function of the image in the region of the chosen curve.

The previously described form of embodiment is based on the recognition that a curve of the grey levels in the direction normal to a material boundary surface that is in fact a sharp or stepped function, is, as a result of the point spread function of the image-generating system, blurred to a curve that corresponds to the integral of the point spread function. The point spread function of the image-generating system can consequently be ascertained from the derivative of this curve or, generally speaking, from the gradient of the curve. As was already explained above, in one preferred form of embodiment, the point spread function is here ascertained separately for different regions of the object representation. In this way it is possible to take into consideration the fact that the point spread function of an image-generating system can be more or less marked for different regions of an object representation. Furthermore, when the point spread function is used for the ascertainment of the correlation length, a directional dependency of the point spread function can also be taken into consideration, so that different correlation lengths are adopted for different directions within the object representation.

Fundamentally, the method according to the invention can contain both the ascertainment of a correlation length from the statistical noise of the image information as well as from the point spread function of the image. A check is here preferably first made as to whether the analysis of the statistical noise could contain sufficiently accurate information for an estimation of the correlation length to be possible. If that is not the case, then in a following further step a check can be made as to whether the correlation length can instead be ascertained from the point spread function of the image.

It is also furthermore possible for different approaches to be chosen for different regions of the object representation, so that the respective chosen approach is matched to the properties of the pixels of the respective region.

In particular it can happen that in certain regions neither the point spread function of the image nor the statistical noise is suitable for ascertaining a correlation length with sufficient accuracy. In these cases it can further be provided that for regions in which such an ascertainment is not possible, an interpolation of the correlation length is performed based on regions in which an ascertainment of the correlation length was still possible. In the ideal case a correlation length can be assigned in this way to each pixel of the object representation.

According to one form of embodiment, the metrological mapping is a computer tomographic measurement, wherein an item of image information of a pixel describes the local x-ray absorption of the object at the position of the pixel. The image information of the pixels is here ascertained by a suitable reconstruction mathematics from projection data that are ascertained in the course of the computer tomographic imaging. It can be expedient in this case to ascertain the noise behavior of the computer tomograph used directly from the projection data. The previously described approaches for ascertaining the amplitude of the noise and the correlation length of the noise can be applied in an identical manner for this purpose for projection data also. The information obtained in this way regarding an uncertainty and a correlation of the projection data can then be converted through the application of the same reconstruction mathematics into corresponding information for the image information of the reconstructed object representation.

In a further aspect, the invention relates to a computer program product with instructions that are executable on a computer which, when executed on a computer, cause the computer to carry out the method as has been described above.

Further features, details and advantages of the invention emerge from the wording herein as well as from the following description of exemplary examples with reference to the drawings. Here.

Features that are similar or identical to one another are identified with the same reference signs below.

Figure 1:
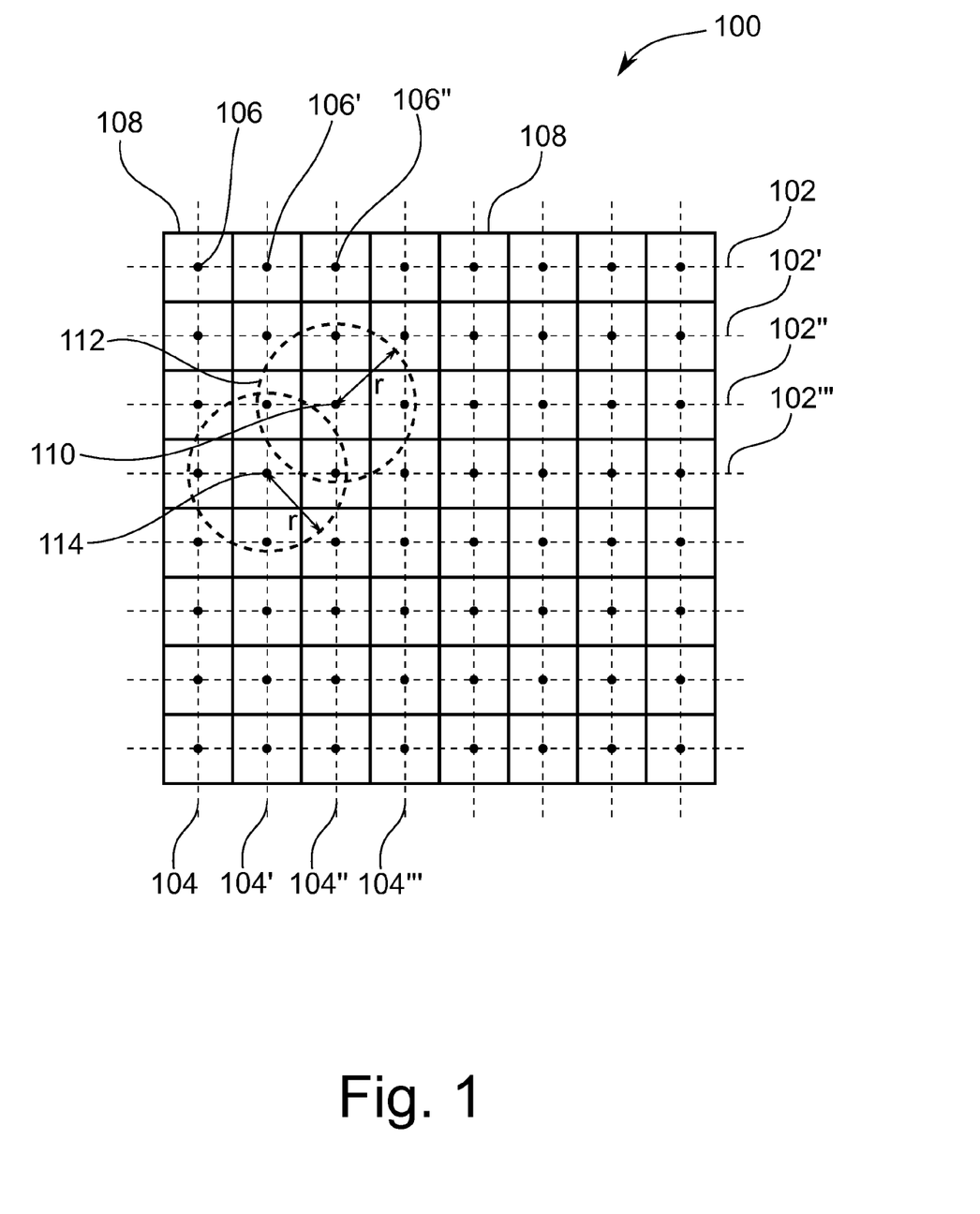
FIG. 1 shows a schematic illustration of a grid with pixels.

FIG. 1 shows a schematic representation of a grid 100 for the representation of an object that has been imaged by means of an image-generating method. Such an object can, for example, be a workpiece or the like. The grid 100 can essentially be formed by a large number of grid lines 102 and 104, which form a square grid in the grid 100 illustrated in FIG. 1. A square grid 100 here refers to a grid 100 in which both horizontal grid lines 102 and vertical grid lines 104 are each arranged equidistantly, wherein the horizontal grid lines 102 intersect the vertical grid lines 104 at a right angle.

Respective pixels 106 are arranged at the intersections of the grid lines 102 and 104 in the illustrated grid 100. An object is overlaid with the grid 100 in order to represent an object by means of the grid 100. Image information that characterizes the object within a defined region 108 around a pixel 106 is then assigned to the pixels 106. Taking the example of a computer tomographic image, the image information of a pixel 106 can, for example, reproduce the local x-ray density of the object in the region 108 around the pixel 106. In the configuration of the grid 100 illustrated in FIG. 1, the region 108 around a pixel 106 that is taken into consideration in the determination of the image information is chosen to be square. To ascertain image information of a pixel 106, a mean value for a material-specific parameter within the region 108 can, for example, be determined, and assigned to the pixel 106 as image information.

As was already described above, in one preferred form of embodiment the image of the object under examination is generated by a computer tomographic imaging process. An object is arranged here between an x-ray source and a detector, and is irradiated with x-ray radiation generated by the x-ray source. The x-ray radiation scattered or transmitted by the object is then registered by the detector and measured. A detector here is in general constructed from a large number of photosensitive cells, which are also referred to as "detector pixels". The detector pixels here are usually arranged in a regular grid. Through the irradiation of such a detector, a rastered projected image of the irradiated object is therefore automatically generated, since the individual detector pixels can only detect a radiation intensity averaged over the surface of a detector pixel. By means of an appropriate back-projection, an image of the geometry of the object can be calculated from the rastered projected images ascertained in this way, wherein said image is also rastered due to the rastering of the underlying projection data.

Due to a large number of effects, the image information ascertained in this way that is assigned to a pixel 106 of the rastered object representation is correlated with the image information of pixels 106' in the surroundings of the pixel 106. Correlation here refers to the fact that the image information of the correlated pixel 106 contains common information, or that the image information of the pixels 106 and 106' are related to one another. The reasons for such a correlation can, for example, be that imaging effects occur during the recording of the projection data wherein an information item that in truth ought to be assigned to only one single detector pixel or, finally, to a single pixel 106, is blurred, so that it is assigned to multiple pixels 106. Such an effect can, for example, be described by the point spread function of the image-generating system.

Electronic image-generating systems are, furthermore, fundamentally subject to statistical noise that causes a deviation of the ascertained image information from the ideal image information that is in fact to be measured. Such statistical noise initially affects all the pixels of the image. Within a specific surroundings about a pixel, the statistical noise affects all of the pixels of the surroundings in a similar manner, or to a similar extent, so that a correlation of the image information of the pixels 106 is also caused by the noise.

Starting from the image information of a first pixel 106, the correlation of image information generally does not extend over the entire representation of the object, but is, rather, spatially limited. The correlation length is characteristic for this spatial limitation. The correlation length here provides information about how far apart pixels 106, 106' must be from one another for it to be possible to assume that the image information of the pixels 106, 106' are no longer related to one another.

In FIG. 1, the correlation length is represented as a circle 112 with a radius r for an exemplary pixel 110 that is located at the intersection of the grid lines 102" and 104". It must be assumed that, for all the pixels 106 within this circle 112, the image information of the pixels 106 is correlated to the image information of the pixel 110. Therefore according to the invention, with the exception of the pixel 110, all of the pixels 106 within the circle 112 are not taken into consideration if a parameter of the imaged object is to be determined from the image information of these pixels.

In order, starting from the pixel 110 to ascertain further pixels 106 whose image information is not correlated, and which could consequently be used for the determination of a parameter and, in particular, of its error, it is possible to proceed as follows: a pixel 106 that is disposed just outside the previously determined circle 110 is first selected. The pixel 114, which lies at the intersection of grid lines 102''' and 104' can, for example, be selected here. The correlation length r' is then in turn determined for the image information of this pixel 114. The correlation length can here either be ascertained individually for this point, or use can be made of a correlation length that was, for example, ascertained previously for the pixel 106 of a particular region of an object representation.

On the basis of the correlation length r' ascertained in this way, an ascertainment is again made of which pixels 106 are disposed within a circle 116 with a radius r' around the pixels 114. The pixels 106 determined here are then also not taken into consideration in a further determination of parameters of the illustrated object. A pixel 106 can then again be selected from the remaining pixels 106, for which the correlation length is again ascertained, and a determination made of which pixels 106 will not, on the basis of these ascertainments, be further used for the determination of parameters of the object. This sequence of steps can here be repeated until no pixels with correlated image information exist any more amongst the pixels 106 relevant for the parameter determination, or until another stop condition is satisfied. The pixels 106 ascertained in this way and the image information assigned to each of them are grouped into a subset of the pixels, and are subsequently used for determination of parameters of the object and for ascertainment of an error of the ascertained parameters.

A schematic illustration of a segment of an object representation 200 is shown in FIG. 2a). The object representation 200 here uses a grid 100, as was described previously in relation to FIG. 1. This is, accordingly, a square grid 100 in which the respective regions 108 that are assigned to a pixel 106, and which graphically represent the respective value of the image information through the display of a grey level, are implemented in a square pattern and arranged regularly. The pixels 106 and the grid lines 102 and 104 are no longer shown here in FIG. 2a) for reasons of clarity.

The image segment of the object representation represented in FIG. 2a) is a vertical material boundary surface of the illustrated object, that is to say a region in which a first material of the object is adjacent to a second material. The material illustrated here on the left-hand side has a greater x-ray absorption than the material illustrated on the right-hand side, since the region on the left-hand side of the image segment is shown lighter than the material on the right-hand side of the image segment. The illustrated region can, for example, be a boundary surface of the represented object at which the object is bounded by the surrounding air.

As a result of the generally sharp transition between two materials that is found at such a material boundary surface, it would be expected that such a sharp edge would also be observable in the object representation 200. Due to a number of factors this is, however, not the case. An important factor that leads to a smearing of sharp contours is the point spread function of the image-generating system. This is generally an approximately Gaussian function that depends on a plurality of parameters of the image-generating system. Through a convolution of a material boundary surface that is in itself sharply delimited with the point spread function of the image-generating system, the curve illustrated in FIG. 2a) is obtained.

A further consequence of the point spread function consists in that the image information of the individual pixels 106 are correlated to one another, since a part of the image information of neighboring pixels 106' always enters into the image information of a pixel 106 and vice versa.

Figure 2:
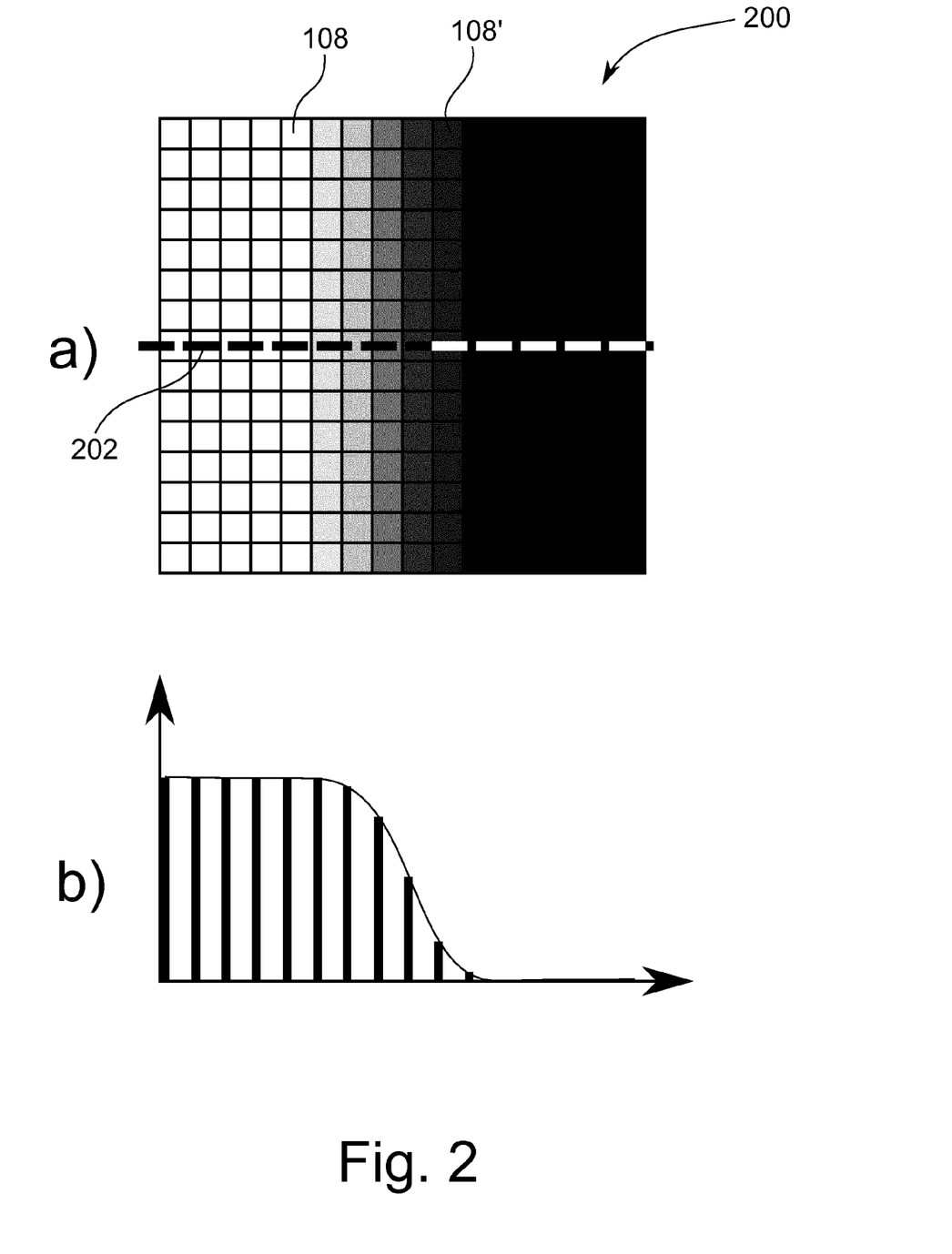
FIG. 2 shows a schematic illustration of a segment of an object representation.

A further factor, not illustrated in FIG. 2 for reasons of clarity, that leads to a correlation of image information consists in the statistical noise with which the image information of the pixels 106 is overlaid. A statistical noise here is a statistically distributed deviation of the image information from an ideal value to be expected while taking further imaging effect into account. The deviation here can be both positive or negative, and generally follows a statistical distribution. Since the image information of all the pixels is equally subject to a statistical noise, a correlation of the image information is also caused by the statistical noise.

As was already explained above, the invention is based on the selection of a subset of pixels 106 for the evaluation of an object representation 200 with respect to a parameter of the object and an error of the parameter in such a way that the image information of the selected pixels 106 is not correlated. A parameter of the object can, for example, be the precise position of the material boundary surface in the object representation 200 which, due to the point spread function of the image-generating system, cannot be imaged sharply. To determine such a material boundary surface, a curve of the grey levels of the object representation 200 along a straight line 202 can be examined for example, wherein the straight line 200 preferably extends perpendicularly to the material boundary surface and consequently represents a surface normal of the material boundary surface.

An exemplary grey level curve along the straight line 202 illustrated in FIG. 2a) is illustrated in FIG. 2b). The grey level of a pixel 106 is reproduced here on the y-axis above a position of the pixel 106 along the straight line 202, illustrated by the position on the x-axis. From the knowledge of the grey level curve, the actual position of the material boundary surface can be determined with the aid of a method, known per se, such as for example the Iso-50 method. From the knowledge of an error of the grey level used here, an error of the determined position of the material boundary surface can further be determined in a manner known per se, for example by means of a Gaussian error propagation.

It can, however, be advantageous both for the determination of the position of the material boundary surface as well as for the determination of an error of the position determination, if the underlying image information is not correlated. The determination of the position of the material boundary surface is simplified here, since a smaller number of measured values need to be taken into account, which on the whole simplifies the calculation. With a suitable selection of the pixels here, there is also no loss of information through the omission of individual pixels, since, due to the correlation of the image information, the image information of an omitted pixel is in the ideal case also contained in the image information of the neighboring pixels.

The determination of an error for the position of the material boundary surface is further simplified, since the error determination from an error propagation is in general possible with simpler mathematical techniques if the data underlying the error consideration are not correlated.

As was previously described with reference to FIG. 1, a subset of pixels 106 can be selected from the pixels 106 of the object representation 200 which can be used for determination of the position of the material boundary surface and for determination of the uncertainty of the position. The correlation length of the object representation is first determined for this purpose. In essence, two approaches are provided here according to the invention.

In a first approach, the correlation length is ascertained as the correlation length of the statistical noise. For this purpose the amplitude of, for example, the statistical noise of the grey levels with respect to the autocorrelation of the amplitude of the noise is analyzed along a straight line, a region, or any other kind of path within the object representation that extends preferably within a region of pixels with homogeneous grey levels. A region with homogeneous grey levels refers, for example, to the region on the far left or on the far right in the object representation 200 illustrated in FIG. 2a). Apart from the overlaid statistical noise, the grey levels of the pixels in these regions are approximately constant, so that the amplitude of the statistical noise at each pixel can be determined in a simple manner.

The autocorrelation of the noise can then be ascertained in a manner known per se from the curve of the values of the amplitude of the noise along a segment within the object representation 200. The correlation length ascertained here can then be used, for example in the manner described previously, to ascertain a subset of uncorrelated pixels which can then be used for further calculations.

Due to the curve of the grey levels in the region of the material boundary surface, the determination of a correlation length can be difficult or even impossible in this region. It is, however, possible according to one form of embodiment, to estimate the correlation length for such a region through the application of an interpolation method to the correlation lengths of neighboring regions. In this way an estimate of the correlation and a suitable selection of pixels is possible even in such regions.

The point spread function of the image can furthermore be used for determination of the correlation length in addition to the analysis of the noise behavior. It can, for example, be provided for this purpose that a curve of the grey levels is determined along a normal to a material boundary surface such as, for example, the straight line 202. The curve of the underlying point spread function then emerges in a simple manner from the gradient of this curve. With the knowledge of the curve of the point spread function, it is then in turn possible for the correlation length resulting from the point spread function to be determined from the width, in particular the half-value width, of the point spread function.

It is also possible here according to the invention that, depending on whether a method for determination of the correlation length is applicable or not, different variants are applied for determination of a correlation length in different regions of the object representation 200. For example, the correlation length of the noise can be determined in a simple manner in the regions to the left and right of the material boundary surface in the object representation 200 of FIG.

2a), while in the region of the material boundary surface a determination of the correlation length can be realized more easily from the point spread function. The appropriate method for determination of the correlation length can therefore be used depending on the situation that is present.

Figure 3:
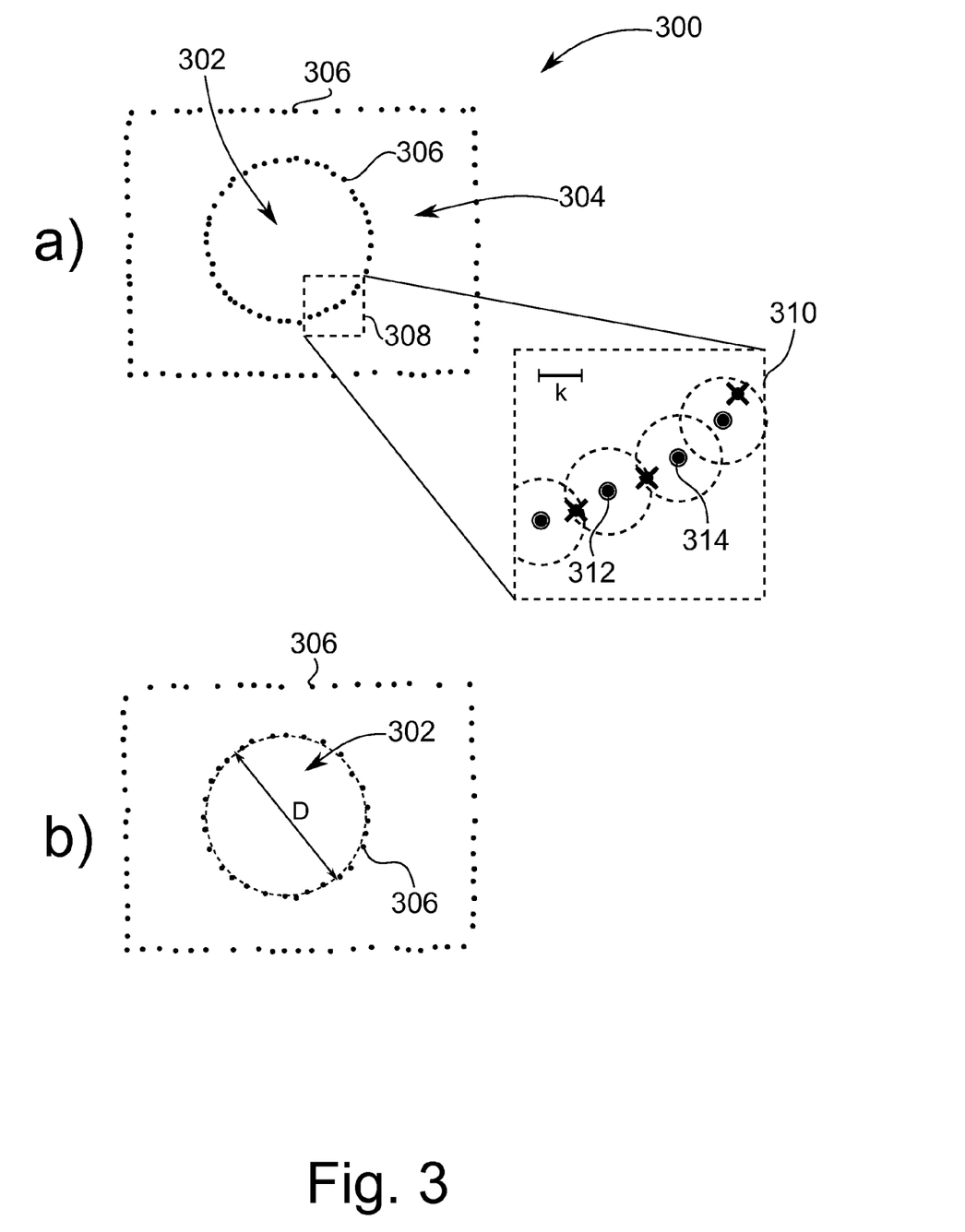
FIG. 3 shows a schematic illustration of an alternative object representation.

FIG. 3 shows an object representation 300 that is alternative to the object representation 200 drawn in FIG. 2, wherein the individual pixels 306 are not arranged on a grid. Rather is the position of a material boundary surface and, in particular, a surface of the represented object, encoded by the pixels 306 of the object representation 300. For this purpose, the pixels are only present at such positions at which the existence of a material boundary surface has been previously ascertained through an appropriate data evaluation. Such a representation can be created in a two-dimensional or three-dimensional form. The position of the pixels can be defined here by coordinates in a two-dimensional or three-dimensional space. To better represent the material boundary surface encoded by the pixels, the pixels can further also be linked up, so that a closed illustration of the surface or of the material boundary surface also results in the interstices between the pixels.

Such an object illustration 300 can, for example, be obtained by evaluating an object representation as is shown in FIG. 2. A material boundary surface of the represented object can be ascertained from the grey levels assigned to the pixels 106 or the regions 108 through the application of appropriate edge-finding operators. These are then encoded by the pixels 306. The image information that is assigned to the pixels 306 of the object representation 300 here is the presence of a material boundary surface at the position of the pixel. Information regarding what kind of material boundary surface is represented at this location, or what material is present on which side of the pixel 306, can further be assigned to such a pixel 306.

The correlation of the individual pixels that has been taken into consideration in the edge-finding also impacts the image information relating to the position of a material boundary surface when the surface representation 300 is ascertained from the grey levels of an object illustration according to FIG. 2. The correlation of pixels 306 that represent a material boundary surface can consequently be ascertained from the correlation of the pixels underlying the edge-finding process, and consequently from the original grey levels of FIG. 2. An error or an uncertainty relating to the position of a material boundary surface can here also be determined from the noise of the image information, for example by means of a model calculation, wherein said error is employed for ascertainment of the material boundary surface.

The object illustrated in the object illustration 300 of FIG. 3 is, for example, a cuboid element 304 such as a metal block with an essentially circular recess 302 in the center. A sectional view of the object is shown here in FIG. 3. The pixels 306 that represent the curved surface of the recess 302 can here be seen to be arranged more densely than the pixels that represent the outer surfaces of the cuboid element 304. The reason for this can be that the significantly fewer surface points are necessary for the representation of a flat surface than for the exact representation of a curved surface. It is, however, to be noted again here that the object representation 300 is only to be understood as an example for the purposes of clarifying the invention. It is also altogether possible for it to be provided that the density of the pixels 306 is the same for all the illustrated surfaces of an object.

In FIG. 3a), a partial region 308 of the pixels 306 that represent the surface of the recess 302 are marked and illustrated in an enlarged detail illustration 310 to the right underneath the object representation 300. In the enlarged illustration 310 here, a correlation length k of the image information of the pixels 306 of the partial region 308 is shown by way of example in the form of a bar to represent the length. The correlation length k can be ascertained here by means of the method described previously. It will be assumed below for the sake of example that the correlation length of the image information is the same everywhere for the whole of the object illustration 300.

For the determination of the first subset of pixels 306 which are to be used below for the ascertainment of a parameter of the represented object, it is first ascertained, starting from a first pixel 312, whether further pixels 306 are at a lower distance from the first pixel 312 than the clearance k. This is illustrated by way of example in FIG. 3, in that a circle with a radius k is drawn around the first pixel 312. Apart from the first pixel 312, all the pixels 306 that are located inside the circle are no longer taken into consideration in what follows in the ascertainment of the first subset of pixels 306, which is illustrated by an X overlaying the corresponding pixels. A further pixel 304 is then selected, and a check is again made as to whether pixels 306 exist whose distance from the pixel 314 is less than the clearance k. In this way, all those pixels that are at least the clearance k apart from one another, and whose image information is consequently deemed to be uncorrelated, are successively ascertained. In the detail illustration 310 circles are drawn around these pixels 306, while the pixels not taken into consideration for the first subset are marked with an X.

FIG. 3b) shows the totality of all the pixels 306 of the object representation of FIG. 3a) that are in each case at least the clearance k apart from one another. These pixels 306 can be used for the determination of a parameter of the illustrated object and, in particular, for a corresponding fault analysis for the parameter determined, since their image information is sufficiently uncorrelated. It is suggested by way of example for this purpose in FIG. 3b) that the diameter D of the recess 302 is ascertained from the pixels 306 that represent the surface of the recess 302 through the adaptation of a circle. As a result of the uncorrelated measured values that underlie the determination of the diameter D the ascertainment of an error for the diameter D ascertained in this way can take place here with simplified mathematics.

The invention is not restricted to one of the above-described forms of embodiment, but can be modified in a variety of ways.

Although FIGS. 2 and 3 only show two-dimensional embodiments of object representations 200 with pixels 106 arranged therein, the above explanations can also be transferred in an analogous manner to a three-dimensional representation of an object. The invention can, furthermore, perfectly well also be applied using other grids than the square grid 100 illustrated in FIGS. 1 and 2. In particular, a grid can also have a different local configuration of a grid that has different grid constants or different alignments of the grid lines 102, 104 used in varying regions of the object representation.

Figure 4:
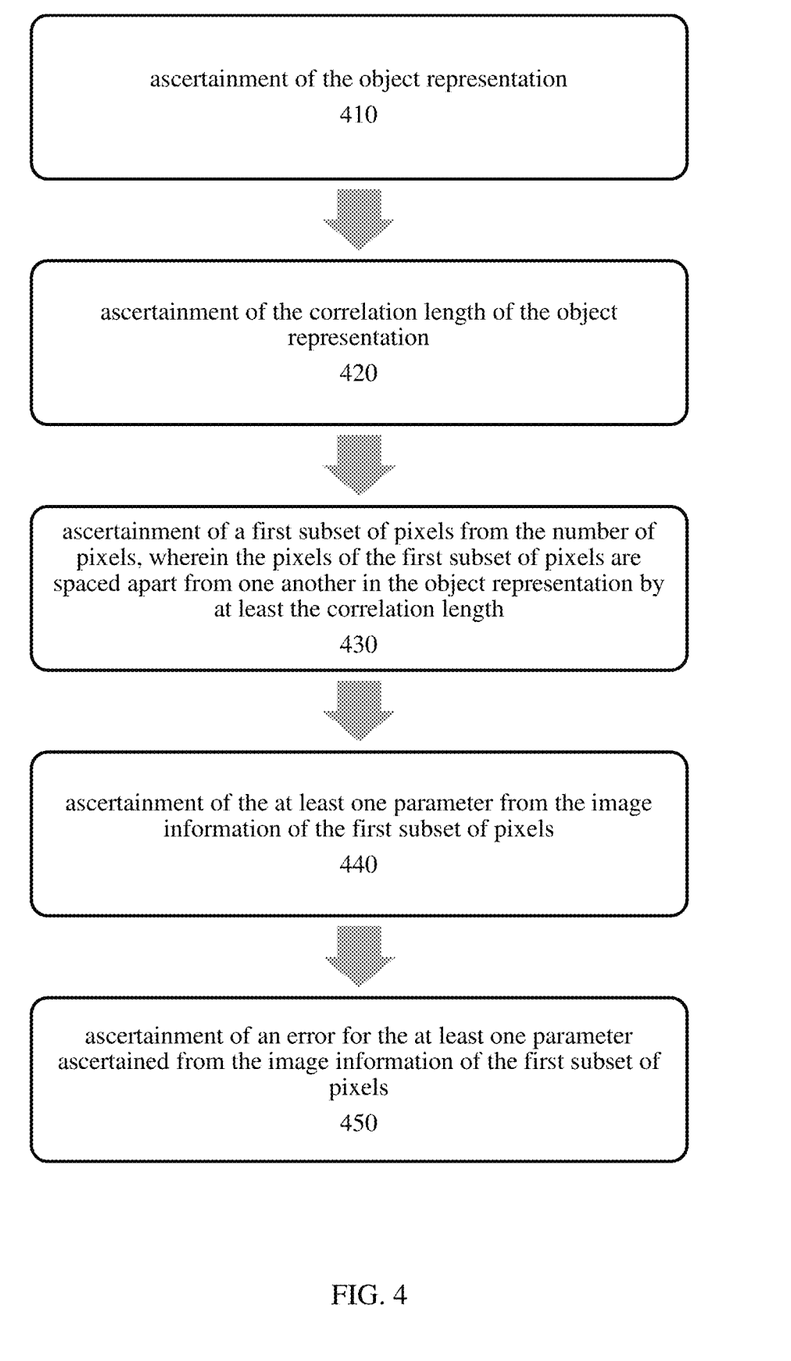
FIG. 4 shows a flow diagram of a process for ascertaining an error.

FIG. 4 shows a flow diagram of a process 400 for ascertaining an error. Process 400 may be a computer-implemented method for determining errors in at least one parameter of the object derived from a digital representation of an object, wherein the digital representation comprises a number of pixels arranged on a grid, wherein at least one item of image information that quantifies a material-specific value of the object at the position of the pixel is assigned to a pixel, wherein the image information results from a metrological mapping of the object, and is overlaid with statistical noise. As a result of the metrological mapping of the object, the image information of a first pixel is correlated to the image information of pixels within a surroundings of the first pixel defined by a correlation length of the image information. Process 400 includes step 410 which is ascertainment of the object representation. Next, step 420 is ascertainment of the correlation length of the object representation. Next, step 430 is ascertainment of a first subset of pixels from the number of pixels, wherein the pixels of the first subset of pixels are spaced apart from one another in the object representation by at least the correlation length. Next, step 440 is ascertainment of the at least one parameter from the image information of the first subset of pixels. Finally, step 450 is ascertainment of an error for the at least one parameter ascertained from the image information of the first subset of pixels.

All of the features and advantages emerging from the descriptions and the drawings herein, including constructive details, spatial arrangements and method steps, can be significant to the invention, both in themselves as well as in a wide variety of combinations.

LIST OF REFERENCE SIGNS

100 Grid
102 Horizontal grid line
104 Vertical grid line
106 Pixel
108 Region
110 Pixel
112 Circle
114 Pixel
200 Object representation
202 Straight line/normal to the surface
300 Object representation
302 Recess
304 Cuboid element
306 Pixel
308 Partial region
310 Detail illustration
312 Pixel
314 Pixel
r Radius
k Correlation length
D Diameter

The invention claimed is:

1. A computer-implemented method for determining errors in at least one parameter of the object derived from a digital representation of an object, wherein the digital representation comprises a number of pixels arranged on a grid, wherein at least one item of image information that quantifies a material-specific value of the object at the position of the pixel is assigned to a pixel, wherein the image information results from a metrological mapping of the object, and is overlaid with statistical noise, wherein as a result of the metrological mapping of the object, the image information of a first pixel is correlated to the image information of pixels within a surroundings of the first pixel defined by a correlation length of the image information, wherein the method comprises the following steps:

ascertainment of the object representation,
ascertainment of the correlation length of the object representation,
ascertainment of a first subset of pixels from the number of pixels, wherein the pixels of the first subset of pixels are spaced apart from one another in the object representation by at least the correlation length,
ascertainment of the at least one parameter from the image information of the first subset of pixels, and
ascertainment of an error for the at least one parameter ascertained from the image information of the first subset of pixels,
characterized in that the correlation length is the correlation length of the noise of the image information of the pixels, and
characterized in that the correlation length of the noise that overlays the image information is ascertained from the image information of pixels of a subregion of the object representation, wherein the image information within the subregion maps a homogeneous region of the represented object.

2. The method as claimed in claim 1, characterized in that the ascertainment of the error contains the ascertainment of the magnitude of the statistical noise of image information of the pixels, wherein the error in the image information is derived from the magnitude of the statistical noise.

3. The method as claimed in claim 2, characterized in that the magnitude of the statistical noise is determined from the image information of the pixels.

4. The method as claimed in claim 2, characterized in that the magnitude of the statistical noise is the standard deviation of the amplitude of the statistical noise.

5. The method as claimed in claim 4, characterized in that the standard deviation of the amplitude of the statistical noise for a pixel of the object representation is determined from the image information of pixels within a defined surroundings around the pixel.

6. The method as claimed in claim 1, characterized in that the method comprises the division of the object representation into at least two subregions, wherein the correlation length for the pixels of one of the partial region is ascertained separately for each of the partial regions.

7. The method as claimed in claim 1, characterized in that the ascertainment of the correlation length contains the ascertainment of the autocorrelation of the noise that overlays the image information.

8. The method as claimed in claim 7, characterized in that the ascertainment of the autocorrelation comprises the ascertainment of the spectral power density of the image information and/or of the noise that overlays the image information, and the performance of a Fourier analysis of the spectral power density.

9. The method as claimed in claim 1, characterized in that the correlation length is a width of a point spread function of the digital representation.

10. The method as claimed in claim 9, characterized in that the ascertainment of the correlation length comprises the following steps:

ascertainment of a second subset of pixels, wherein the image information of the second subset of pixels represents at least a material boundary surface of the object,
ascertainment of a curve of the image information of the second subset of pixels along a normal to the material boundary surface,
ascertainment of the point spread function from the ascertained curve of the image information, and
ascertainment of the width of the point spread function.

11. The method as claimed in claim 1, characterized in that the metrological mapping is a computer tomographic measurement, wherein an item of image information of a pixel describes the local x-ray absorption of the object at the position of the pixel.

12. A non-transitory computer program product with instructions that when executed by a processor on a computer, cause the computer to carry out the method as claimed in claim 1.

* * * * *